Nov. 18, 1952  T. A. LANCASTER  2,618,580
PROCESS OF MAKING A POROUS ORGANIC FILM
Filed Jan. 18, 1949
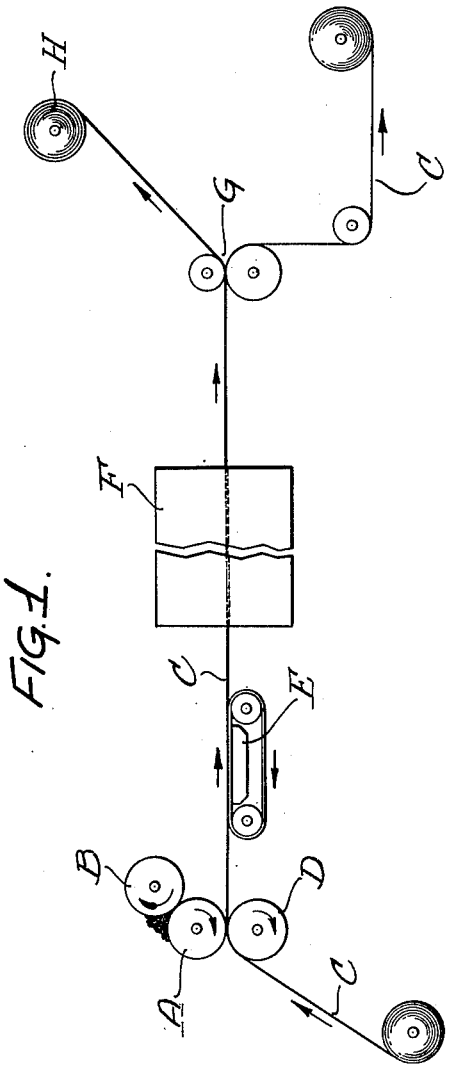
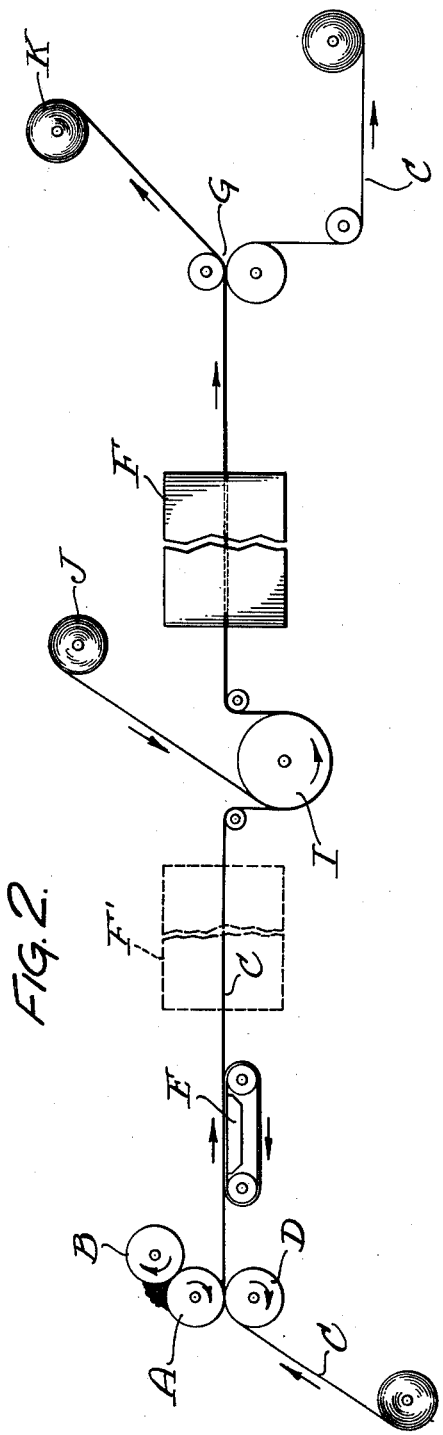
Inventor:
Talbot A. Lancaster
by his Attorneys
Howson &
Howson Patented Nov. 18, 1952

2,618,580

UNITED STATES PATENT OFFICE 2,618,580

PROCESS OF MAKING A POROUS ORGANIC FILM

Talbot A. Lancaster, Canterbury, Conn., assignor, by mesne assignments, to Lamitex Products, Inc., New York, N. Y., a corporation of Delaware Application January 18, 1949, Serial No. 71,461

16 Claims. (Cl. 154—97.5)

The present invention relates to a novel process of preparing an organic film, and more particularly it relates to a process by which an organic film characterized by porosity due to the presence of minute perforations therein may be readily and economically prepared. In addition, the invention relates to a process for preparing a unitary product comprising the porous film and a porous material, for example an absorbent material, adhered together.

Heretofore, in most instances, it has been desirable to produce an organic film which is impervious to air and moisture vapor, and for this reason, the films usually manufactured have been continuous and free from perforations. At times, however, it is desirable to produce a film that possesses porosity, for example one that is pervious to air and moisture vapor. Several procedures have been devised for the production of such a film, including the casting of the film from an aerated film-forming composition and the perforation of a continuous film by a mechanical or electronic perforator. While these procedures may be successfully employed, certain disadvantages are inherent therein, for example, in the method involving the casting of an aerated film-forming composition, difficulties are encountered in controlling the degree of porosity of the film and in the procedure wherein the continuous film is perforated by a mechanical or electronic perforator, an additional step after the film is formed is required.

It is, therefore, an object of the present invention to provide a process by which an organic film characterized by desired porosity may be economically prepared.

A more specific object of the invention is to provide a process for preparing a porous organic film wherein control of porosity of the film is afforded and wherein the required porosity is imparted to the film during the production thereof.

Still another object of the invention is to provide a process for preparing a unitary porous product in which a porous organic film and a porous sheet material, preferably a porous absorbent material are adhered together.

Other objects of the invention will be apparent from a consideration of this specification and the claims.

In the drawings, Figure 1 illustrates diagrammatically the preferred form of apparatus which may be used in carrying out the process of the present invention where the porous film itself is to be produced; and Figure 2 illustrates diagrammatically the preferred form of apparatus by which the unitary article comprising the film and the porous sheet material adhered together may be produced.

In accordance with the process of the invention, a suspension of organic film-forming material is applied to a moving surface to form a pasty sheet of the suspension; the pasty sheet is then transferred, by pressure exerted between the surfaces to a second moving surface moving in a direction opposite that of the first surface, the linear or surface speed of which exceeds the linear or surface speed of the first-moving surface and the sheet of the suspension is then subjected to heat to remove any volatile components contained in the suspension and cause the film-forming particles thereof to flux to form a film. It has been found that by this procedure, the pasty sheet of material on the second-moving surface and the film produced after the fluxing of the film-forming particles will be porous and the degree of porosity for any given film thickness, can be controlled by varying the extent which the speed of movement of the second-moving surface in its direction of movement exceeds the speed of movement of the first-moving surface in its direction of movement; that is to say, the greater the speed of the second-moving surface in its direction of movement as compared to the speed of the first-moving surface in its direction of movement, the greater will be the number of perforations present in the fluxed film and hence the greater will be the porosity or penetrability of the film. Obviously, the penetrability of the porous films prepared in accordance with the present process will depend to some extent upon the thickness of the film, and in general the thicker the porous film the less the penetrability as compared to a thinner film prepared under the same conditions. As will be discussed more fully hereinafter, the pasty, porous sheet of material formed on the second-moving surface and before the film-forming particles thereof are fluxed may be placed in contact with a porous material, for example an absorbent material, and thereafter subjected to heat to flux the film-forming particles and to adhere the film and the porous material together.

The film of the present invention either by itself or adhered to the porous material may be used in the various instances where porosity of the film to permit the passage of gas or vapor therethrough is desired. For example, the porous film adhered to an absorbent material may advantageously be used as the meat wrap described and claimed in the copending application of Carleton S. Francis, Jr., Serial No. 52,423, filed October 1, 1948, now abandoned in favor of application Serial No. 204,480, filed January 4, 1951. The meat wrap, as described in the Francis application, comprises a moisture-vapor-permeable, pliable, extensile, substantially odorless and tasteless water-resistant organic film and an absorbent material adhered together. Preferably, the film is a synthetic resin film and has sufficient porosity so that it has a moisture-vapor penetrability between 0.25 and 2.75 grams per 50 square centimeters per 24 hours at room temperature and 100% relative humidity (measured according to the Technical Association of the Pulp and Paper Industry standard method T-448-m-46). A porosity within the stated range, as well as higher and lower porosities may readily be provided in the film by the process of the present invention by controlling the relative speeds of the two moving surfaces as described. Thus, as indicated above, very low porosity films may be obtained by employing a very small difference in speeds between the two moving surfaces and, on the other hand, very porous films may be produced by using a high difference in speeds. Generally, to provide a film possessing porosity, the linear speed of the first moving surface in its direction of movement will not exceed about 95% of the speed of the second moving surface. While the upper limit of the difference in speeds, and hence of the porosity of the film, is only restricted by the requirement that the material shall be formed on the second-moving surface as a pasty sheet of material with sufficient contact between the film-forming particles thereof to provide a film upon fluxing of the particles, the linear speed of the first moving surface will generally not be less than about 50% of the speed of the second moving surface. In most cases, a linear speed of the first moving surface of between about 60% and about 90% of the linear speed of the second moving surface will be employed.

Referring to the suspension of film-forming material, the film-forming material may be any organic material which will flux upon subjection to heat and which can be formed as a suspension containing finely divided or dispersed particles. The suspension will contain sufficient film-forming particles to provide a film after fluxing of the particles and, generally, the suspension will have a viscosity range of about 100 to 10,000 or 15,000 centipoises, when measured at room temperature with a Brookfield synchro-electric viscosimeter at 20 R. P. M. and using a 10x spindle, depending on the thickness of the film desired. When a film between about ½ and about 2½ mils in thickness is desired, the viscosity, as measured above, is preferably between about 300 and about 2,500 centipoises.

The film-forming material is preferably a thermoplastic resinous material and, in many instances, the use of a polyvinyl type of resin will be found to be particularly advantageous. Examples of such resins are polyvinyl halides (typified by polyvinyl chloride), polyvinyl esters of the lower aliphatic acids (typified by polyvinyl acetate), polyvinylidene halides (typified by polyvinylidene chloride), the polyvinyl materials exemplified by polyvinyl formal, polyvinyl acetal, and polyvinyl butyral, and polyvinyl alcohol. Of especial advantage for use are polyvinyl chloride and the copolymers of polyvinyl chloride and polyvinyl acetate, in which the chloride content is at least 80%, for example a copolymer of polyvinyl chloride-acetate in the ratio of 96 parts of the chloride to 4 parts of acetate and having an intrinsic viscosity of 1.52. Other examples of synthetic resinous materials that are applicable for use are the polyesters of acrylic and methacrylic acid such as methyl methacrylate resin, the film-forming polyamide resins and the copolymers of styrene and butadiene. In place of using a synthetic resinous material, natural or synthetic elastomers, cellulose esters and ethers or polyethylene may be used. Examples of the natural or synthetic elastomers are polyisobutylene (butyl rubber) butadiene acrylonitrile, butadiene-styrene, polyisoprene, latex, natural rubber, the hydrochlorinated derivatives thereof, and chlorinated rubber. Examples of the cellulose esters and ethers are cellulose acetate, nitrocellulose, and ethyl cellulose.

As stated above, the film-forming material is prepared in the form of a suspension in a medium in which the film-forming particles are substantially insoluble at room temperature, for example, as a plastisol, an organisol, or a latex, as distinguished from a solution thereof. Such suspension may be prepared by any of the well-known procedures; for example, the film-forming material may be suspended in a plasticizer with or without a dispersing agent serving as a diluent to form the plastisol or organisol, or it may be suspended in an aqueous medium to form a latex. Likewise, the suspension may be produced at the time the film-forming particles are formed, for example by polymerization of the monomeric material previously emulsified in the presence of the aqueous medium. If desired, pigments, fillers, dyes, and the like may be included in the suspension as is also in accordance with known practice.

In connection with the preferred method of forming the porous film of the invention, reference may be made to Figure 1 of the accompanying drawing which illustrates diagrammatically one form of apparatus which may be used. The drawing illustrates the conventional reverse roll type of applicator in which the suspension being cast is metered between two rolls, namely applicator roll A and doctor roll B. The quantity of material applied to applicator roll A is dependent on the setting of doctor roll B with respect to roll A and thus the thickness of the pasty sheet and of the resulting film may be readily controlled. The metered suspension in the form of a sheeted plastic mass is then transferred from the applicator roll A to web C, moving in the opposite direction to roll A, by utilizing the wiping action effected through application of pressure by back-up roll D. The web C may be any suitable material from which the material carried thereby may be stripped, for example a polished metal band or a belt of fabric or paper treated with a material which is unaffected by the materials present in the suspension and provides the web with an inert relatively smooth surface. Web C is moved in the direction of the arrow by the suction apron E and the back-up roll D. In the apparatus of the type described, the linear speed of web C will generally not exceed about 600 ft. per minute, and often is in the neighborhood of about 100 ft. per minute. The web C carrying the sheet material is subjected to heat, for example by passing the web and sheet material through an oven F or over a heating plate (not shown) to remove any volatile components contained in the suspension and cause the particles of film-forming material to flux to form the film. Thereafter, the film may be stripped from the web at point G and wound on roll H and the web C may be wound on a roll or returned in an endless system.

In the preparation of a unitary article where the porous film and porous sheet material, preferably absorbent material, are adhered together, the apparatus illustrated in Figure 2 may be advantageously employed. So far as applicator roll A, doctor roll B, web C, back-up roll D, and suction apron E are concerned, they correspond to the same parts as illustrated in Figure 1 and the description given in connection with Figure 1 is also applicable thereto. There is illustrated in Figure 2 in dotted lines at F¹ a preheating oven, the use of which is optional but at times it may be desirable to remove at least a portion of the volatile constituents from an organisol or a latex before bringing the porous sheet material in contact with the film. The porous sheet material, for example cloth on roll J, is passed around the laminating roll I around which web C also passes. The pressure exerted between web C and laminating roll I causes adhesion between the pasty sheet of material and the porous sheet material. Thereafter, the composite material is passed through the heated oven F or over a heated plate (not shown) to remove any volatile material contained in the material to flux the resin to form the porous film. The unitary sheet material may then be stripped from the web C at G and wound on roll K. The web C, as in Figure 1, may be wound on a roll or returned in an endless system.

While the apparatus is conventional, it is not operated in a conventional manner. In the usual operation of such a machine, where continuous films free of perforations are provided, it is necessary that the applicator roll A shall move at a surface speed at least equal to, and preferably greater than, that of web C. In contrast to this, in carrying out the process of the present invention, the linear or surface speed of web C on which the sheet material is carried and fluxed in its direction of movement always exceeds the linear or surface speed of the applicator roll A in its direction of movement and, as stated, the sheet material thereby acquires minute holes or perforations. When the material is subjected to heat to flux the particles of plastic material, the film-forming material does not flow sufficiently to destroy the minute holes or perforation and a porous film is obtained.

From the above description, it will be apparent that in carrying out the process of the invention a suspension of film-forming material is applied to a moving surface, preferably a surface moving in a cylindrical path, the amount of suspension applied being determined by the thickness of the film desired. While in most instances, the amount of suspension applied will provide a film thickness of between ½ mil and 4 mils, usually between ½ mil and 2½ mils, films of less or greater thickness can be produced if desired. The suspension in the form of a sheeted mass is then transferred from the first-moving surface to a second-moving surface, moving in a direction opposite to that of the first-moving surface, preferably such a surface moving in a path substantially tangential to the said first surface, for example in a horizontal direction, by pressure exerted between the two moving surfaces. In the preferred embodiment, the two surfaces move in opposite directions at the point of tangency. With respect to the linear or surface speeds of the moving surfaces, the second-moving surface will have a greater linear speed in its direction of movement than the linear speed of the first-moving surface in its direction of movement, the difference in speeds between the two surfaces determining, with a given suspension, the porosity of the material deposited on the second-moving surface and consequently of the film produced upon heating of the material to flux the resin. It will thus be seen that means, namely the differences in linear speeds of the two surfaces, are provided by which the porosity of the film may be controlled to produce a film of desired permeability; that is to say, the difference in the linear speeds of the two moving surfaces in their respective directions of movement may be predetermined to provide, with a given suspension, the required porosity of the film. After the material is deposited in the form of a pasty mass on the second-moving surface, it is subjected to the heating step described which is brought about while the material is carried by the second-moving surface. As stated, the heating step removes any volatile components contained in the suspension, for example the low boiling liquids contained in an organisol or the water contained in a latex and fluxes the film-forming particles to form the porous film.

When a product comprising a porous film and a porous sheet, for example an absorbent material, adhered together is desired, the process differs only in the application of the porous sheet to the upper surface of the pasty mass while it is supported on the second-moving surface and the pressure employed to cause the plastic paste to penetrate the porous material will be sufficient to provide adhesion. It is not desirable to force the plastic paste through the porous material, but usually it will be desirable to use sufficient pressure to cause the paste to penetrate into the porous material to the extent of approximately one-half of the thickness of the porous material. After the porous material and pasty sheeted mass comprising the particles of film-forming material have been brought into contact as described, the assembly is subjected to heat to remove any volatile material present and to cause the particles of film-forming material to flux to form the film. As stated, if desired, all or a part of any volatile material may be removed by a preheating step preceding the application of the porous material to the sheeted pasty mass. The film thus formed retains its porosity and may at the same time, if desired, be restricted to one surface of the porous material.

The porous material is preferably an absorbent material which may be any material comprising absorbent fibres, for example cotton, rayon, paper, and the like and may be in the form of woven, knitted, netted, or unwoven fabric such as a felt, web, bat, paper, and the like. When the resulting product is to be used as a meat wrap, the absorbent material will advantageously be capable of retaining at least 30%, and preferably at least 40%, moisture based on the bone dry weight of the absorbent material, when the product is soaked in water and then hydroextracted at a peripheral speed of 3,250 feet per minute, as described in said Francis application Serial No. 52,423, now abandoned as aforesaid. Also as stated in that application, a fabric of conventional weave construction 5 to 9 yards of which weigh one pound, and preferably a fabric 6 to 8 yards of which weigh one pound, will be employed. In place of absorbent material, any other porous material may be applied to the pasty mass and the unitary product formed as described above.

It is to be understood, of course, that the process may be carried out on other types of apparatus having two moving surfaces operating as described and that the use of the apparatus illustrated has been given merely as one form of apparatus which may be employed.

The following examples of the process of the invention are given for illustrative purposes only:

Example 1

An organisol suspension of a copolymer of vinyl chloride (96%) and vinyl acetate (4%) having an intrinsic viscosity of 1.52, dispersed in a liquid phase comprising dioctyl phthalate, xylol, and a high naphthenic mineral thinner, boiling range of 110° C. to 149° C., was prepared in which there were present 100 parts of the copolymer, 100 parts of dioctyl phthalate, 25 parts of xylol, and 25 parts of the mineral thinner. The suspension which had a viscosity of 1200 centipoises Brookfield measured as above described, and a Zahn flow of 37 seconds (using a #2 Zahn cup), was metered onto applicator roll A by the aid of doctor roll B. The pasty layer of resin suspension was then transferred to web C which comprised a paper coated with a material insoluble in organic solvents, for example, methyl cellulose. The amount of organisol metered onto applicator roll A was controlled to provide a film 1 mil in thickness. The surface speed of the applicator roll A was 60 feet per minute and the speed of movement of the web C was 90 feet per minute. A pasty mass in sheet form having minute perforations was formed on web C and after this mass was heated to 200° C. to remove the low boiling point liquids and to cause the resin particles to flux, a film was provided with a moisture vapor permeability or moisture-vapor transmission rate of between 0.7 and 2.0 grams of water vapor per 50 square centimeters per 24 hours at room temperature, when measured by "TAPPI" method T-448-m-46. The film had a Gurley densometer reading of 0-5 seconds as determined by "TAPPI" method T-460-m-46. (The Gurley densometer measures the porosity of a one square inch area. Several readings are taken over different places on the film. Since the actual porosity at one point in a film may vary somewhat from the porosity at another point, Gurley densometer readings are given in terms of a range between minimum and maximum densometer readings for any film measured.)

Example 2

The pasty mass in sheet form was produced as described in Example 1, and a cotton fabric, 7 yards of which weigh one pound, was applied, with the aid of the slight pressure produced by laminating roll I, to the upper surface of the plastic mass prior to the heating step. Thereafter, the assembly was subjected to the heating step to remove the low boiling point liquids and to flux the resin. The resulting product was a unitary article with the film and cloth adhered together. The film so produced had the same moisture-vapor permeability as that of the film above described, and, since the cloth was absorbent, a porous product was obtained.

Example 3

The same procedure was followed as in Example 1, except that the surface speed of applicator roll A was increased to 70 feet per minute. The resulting film has a Gurley densometer reading of 5 to 10 seconds.

Example 4

The same procedure was followed as in Example 1 except that the surface speed of applicator roll A was increased to 75 feet per minute. The resulting film had a Gurley densometer reading of 30 to 45 seconds.

Example 5

In order to illustrate the effect of film thickness on the penetrability properties of the porous film, the same procedure was followed as in Example 3 except that a small additional amount of xylol was employed in the organisol to provide a Brookfield viscosity of 400 centipoises, and a Zahn flow of 18 seconds, and sufficient organisol was metered onto applicator roll A to provide a film 2.1 mils in thickness. The resulting film had a Gurley densometer reading of 15 to 18 seconds. The number of holes, determined by counting the holes in an 8" x 10" sheet was about 1360.

Example 6

The same procedure was followed as in Example 4, except that a small additional amount of xylol was employed in the organisol to provide a Brookfield viscosity of 400 centipoises and a Zahn flow of 18 seconds, and sufficient organisol was metered onto applicator roll A to provide a film 2.4 mils in thickness. The resulting film had a Gurley densometer reading ranging from 70 to 500 seconds. The number of holes was 240 in an 8" x 10" section of the film.

Example 7

In this example the procedure of Example 1 was followed, except that the surface speed of applicator roll A was increased to 80 feet per minute, a small additional amount of xylol was employed in the organisol to provide a Brookfield viscosity of 400 centipoises and a Zahn flow of 18 seconds, and sufficient organisol was metered onto applicator roll A to provide a film 2.4 mils in thickness. The resulting film had a Gurley densometer reading ranging from 280 seconds to infinity. There were 20 holes in an 8" x 10" section of the film.

Considerable modification is possible in the selection of the suspension of the film-forming material employed, as well as in the manner of carrying out the process including the relative speeds of the two moving surfaces, without departing from the essential features of the present invention.

I claim:

1. The process of preparing a porous organic film which comprises applying a suspension of an organic film-forming material to a moving surface; transferring the said suspension from said moving surface to a second surface, moving in a direction opposite to said first surface, by pressure exerted between the said two moving surfaces, the linear speed of movement of said second-moving surface being greater than the linear speed of movement of said first-moving surface; and thereafter subjecting the pasty sheet of material thus formed and while it is supported on the said second-moving surface to heat to remove any volatile components and to flux the particles of film-forming material to form said porous film.

2. The process of claim 1 wherein the organic film-forming material is a thermoplastic resin.

3. The process of claim 1 wherein the organic film-forming material is vinyl resin.

4. The process of claim 1 wherein the organic film-forming material is a copolymer of vinyl chloride and vinyl acetate.

5. The process of preparing a porous organic film which comprises applying a suspension of an organic film-forming material to a surface moving in a circular path; transferring the said suspension from said moving surface to a second surface, moving in a path substantially tangentially to the said first surface and in an opposite direction thereto, by pressure exerted between the said two moving surfaces, the linear speed of movement of said second moving surface being greater than the linear speed of movement of said first moving surface and the difference in linear speeds of said two surfaces being predetermined to provide the required porosity; and thereafter subjecting the pasty sheet of material thus formed and while it is supported on said second-moving surface to heat to remove any volatile compounds and to flux the film-forming particles to form said porous plastic film.

6. The process of claim 5 wherein the organic film-forming material is a thermoplastic resin.

7. The process of claim 5 wherein the thermoplastic resin particles are vinyl resin particles.

8. The process of claim 5 wherein the thermoplastic resin particles are particles formed from a copolymer of vinyl chloride and vinyl acetate.

9. The process of preparing a porous unitary product comprising a porous organic film and a porous sheet material which comprises applying a suspension of an organic film-forming material to a moving surface, transferring the said suspension from said moving surface to a second surface, moving in a direction opposite to said first surface, by pressure exerted between the said two surfaces, the linear speed of movement of said second moving surface being greater than the linear speed of movement of said first-moving surface; applying a porous sheet material to the pasty sheet of material thus formed while the said sheet material is supported on said second moving surface; and thereafter subjecting the assembled material to heat while it is supported on said second moving surface to remove any volatile components and flux the particles of film-forming material to form said porous plastic film and to adhere said film to said porous sheet.

10. The process of claim 9 wherein the organic film-forming material is a thermoplastic resin and wherein the porous sheet material is an absorbent material.

11. The process of claim 9 wherein the organic film-forming material is a vinyl resin and wherein the porous sheet material is an absorbent material.

12. The process of claim 9 wherein the organic film-forming material is a copolymer of vinyl chloride and vinyl acetate and wherein the porous sheet material is a woven cloth.

13. The process of preparing a porous unitary product comprising a porous organic film and a porous sheet material which comprises applying a suspension of an organic film-forming material to a surface moving in a circular path; transferring the said suspension from said moving surface to a second surface, moving in a path substantially tangentially to the said first surface and in an opposite direction thereto, by pressure exerted between the said two moving surfaces, the linear speed of movement of said second-moving surface being greater than the linear speed of movement of said first moving surface and the difference in linear speeds of said two surfaces being predetermined to provide the required porosity; applying a porous sheet material to the pasty sheet of material thus formed while the said sheet material is supported on said second moving surface; and thereafter subjecting the assembled material to heat while it is supported on said second-moving surface to remove any volatile components and flux the particles of film-forming material to form said porous plastic film and to adhere said film to said porous sheet.

14. The process of claim 13 wherein the organic film-forming material is a thermoplastic resin and wherein the porous sheet material is an absorbent material.

15. The process of claim 13 wherein the organic film-forming material is a vinyl resin and wherein the porous sheet material is an absorbent material.

16. The process of claim 13 wherein the organic film-forming material is a copolymer of vinyl chloride and vinyl acetate and wherein the porous sheet material is a woven cloth.

TALBOT A. LANCASTER.

REFERENCES CITED

The following references are of record in the file of this patent:

UNITED STATES PATENTS

| Number | Name | Date |
|---|---|---|
| 2,262 | Hayward | Mar. 19, 1850 |
| 1,346,615 | Thoma | July 13, 1920 |
| 2,000,347 | Murray | May 7, 1935 |
| 2,199,228 | Obenshain et al. | Apr. 30, 1940 |
| 2,444,094 | Duggan | June 29, 1948 |